United States Patent
Chini et al.

(10) Patent No.: US 6,912,262 B1
(45) Date of Patent: Jun. 28, 2005

(54) WIDEBAND SYMBOL SYNCHRONIZATION IN THE PRESENCE OF MULTIPLE STRONG NARROWBAND INTERFERENCE

(75) Inventors: Ahmad Chini, Vaughan (CA); Hossein Alavi, Mississauga (CA); Mehdi T. Kilani, Mississauga (CA); Mohammad J. Omidi, Mississauga (CA)

(73) Assignee: Maxim Integrated Products, Inc., Sunnyvale, CA (US)

( * ) Notice: Subject to any disclaimer, the term of this patent is extended or adjusted under 35 U.S.C. 154(b) by 853 days.

(21) Appl. No.: 09/939,424

(22) Filed: Aug. 24, 2001

Related U.S. Application Data

(60) Provisional application No. 60/287,532, filed on Apr. 30, 2001.

(51) Int. Cl.[7] ............................................... H04L 7/00
(52) U.S. Cl. ..................... 375/365; 375/364; 375/362; 375/260; 375/366; 370/514
(58) Field of Search ............................... 375/354, 362, 375/260, 364–368, 344, 326; 370/514, 515, 509

(56) References Cited

U.S. PATENT DOCUMENTS

| | | | | |
|---|---|---|---|---|
| 5,383,225 A | * | 1/1995 | Aguirre et al. | ............. 375/354 |
| 5,444,697 A | | 8/1995 | Leung et al. | |
| 5,652,772 A | * | 7/1997 | Isaksson et al. | ............ 375/367 |
| 5,889,759 A | | 3/1999 | McGibney | |
| 6,074,086 A | | 6/2000 | Yonge, III | |
| 6,091,702 A | | 7/2000 | Saiki | |
| 6,111,919 A | | 8/2000 | Yonge, III | |
| 6,314,083 B1 | * | 11/2001 | Kishimoto et al. | .......... 370/210 |
| 6,618,452 B1 | * | 9/2003 | Huber et al. | ................ 375/343 |
| 6,728,326 B1 | * | 4/2004 | Fulghum | .................... 375/365 |

OTHER PUBLICATIONS

Timothy M. Schmidl and Donald C. Cox, "Robust Frequency and Timing Synchronization for OFDM," IEEE Transactions on Communications, vol. 45, No. 12, Dec. 1977.

Jan–Jaap Van De Beek, "ML Estimation of Time and Frequency Offset in OFDM Systems," IEEE Transactions on Signal Processing, vol. 45, No. 7, Jul. 1997.

* cited by examiner

*Primary Examiner*—Phuong Phu
(74) *Attorney, Agent, or Firm*—Blakely, Sokoloff, Taylor & Zafman LLP

(57) ABSTRACT

A method and apparatus for time-shift extraction in a wideband transmitted signal containing strong narrowband interference or noise. The time-shift extraction is based on the time domain and frequency domain relation of symbol misalignment. The invention uses the sign of the product of a recieved signal sample and a reference symbol in the frequency domain to determine the time-shift. It does not rely on the signal magnitude and is therefore less dependent on the signal gain. It also does not rely on the soft phase values, which have ambiguity for values more than three hundred sixty (360) degrees.

46 Claims, 7 Drawing Sheets

```
synch_symbol=randn(1,256);
Preamble=[synch_symbol, synch_symbol, synch_symbol,
synch_symbol];
Ref_symbol=fft(synch_symbol,256);
Ref_symbol= Ref_symbol(1:128);
% Assume r is a vector of 256 samples taken from the stream
of data, which is % coming out of ADC with a random
starting time. Assume w is a vector of 256  % samples
representing windowing function.
w=hanning(256);
x=r.*w;
X=fft(x,256);
X=X(1:128);
Y=X.*conj(Ref_symbol);
A=sign(real(Y));
B=sign(imag(Y));
C=conv(A,B);
c=fft(C,256);
Synch=real(c(1:128))+imag(c(1:128));
[Peak,Index]=max(abs(Synch));
Time_Shift=(Index-1)*sign(Synch(Index));
```

Figure 3

WIDEBAND SYMBOL SYNCHRONIZATION IN THE PRESENCE OF MULTIPLE STRONG NARROWBAND INTERFERENCE

CROSS REFERENCE TO RELATED APPLICATIONS

This non-provisional United States (U.S.) patent application claims the benefit of U.S. Provisional Application No. 60/287,532, filed by inventors Ahmad Chini et al. on Apr. 30, 2001, titled "Wideband Symbol Synchronization In The Presence Of Multiple Strong Narrowband Interference".

FIELD

This invention relates generally to communication devices, systems, and methods. More particularly, one embodiment of the invention relates to a method, apparatus, and system for wideband symbol synchronization in the presence of multiple strong narrowband interference.

GENERAL BACKGROUND

Receiver devices or systems in a communication system may receive signals or waveforms which are distorted by interference or noise. Some wideband communication systems are supposed to work in the presence of strong narrowband interference.

Despite such narrowband interference, a receiving device must be able to detect a signal and determine its content. A receiving device must be able to align or synchronize the received signal in order to determine the start of a signal or message and/or to determine whether such signal contains a message.

However, many time domain and frequency domain synchronization algorithms fail in the presence of such interference. Some algorithms are more complex and some do not tolerate multiple interference. Some algorithms are very sensitive to the signal gain or require specific forms of symbols or patterns for synchronization.

Time domain correlation synchronizers may be used for synchronization but require many high-resolution multiplications for each received sample. For instance, 256×256 multiplications are required for a time domain correlation synchronizer for a synchronization symbol two hundred fifty-six (256) samples long.

Some time domain synchronizers use only the received signal sign to reduce the implementation complexity. However, such sign-based synchronizers often fail in the presence of strong narrowband interference.

Some frequency domain correlation synchronizers have to calculate the fast Fourier transform (FFT) coefficient of the signal on each coming time sample. This obviously is very complex to implement in real-time applications.

There is a frequency domain symbol synchronizer, which is based on only one time FFT calculation per symbol (each symbol comprising multiple time samples). However, this approach is based on calculation of FFT output phases and requires comparison with every possible phase settings to obtain the timing reference. Phase calculations and a large number of comparisons make this approach less attractive compared to the approach of the invention.

BRIEF DESCRIPTIONS OF THE DRAWINGS

FIG. 3 is an exemplary code illustrating the operation at various points on the block diagram in FIG. 2.

DETAILED DESCRIPTION

In the following detailed description of the invention, numerous specific details are set forth in order to provide a thorough understanding of the invention. However, it is contemplated that the invention may be Practiced without these specific details. In other instances well known methods, procedures, components, and circuits have not been described in detail so as not to unnecessarily obscure aspects of the invention.

To address the problem of signal alignment or synchronization in the presence of interference, the invention provides a frequency domain symbol synchronization algorithm which works in the presence of multiple strong narrowband interference signals. Wideband Code Division Multiple Access (CDMA) and Orthogonal Frequency Division Multiplexing (OFDM) are among the communication systems, which could be benefited from this algorithm.

In one aspect of the invention, frequency analysis of the received signal confines narrowband interference signals to a small portion of the signal bandwidth. The signal is then processed to find the symbol time-shift, indicating the amount of signal misalignment, which appears as a modulated signal in the frequency domain. The modulating frequency is extracted and used to estimate the symbol time-shift.

For purposes of synchronization or signal alignment, a number of wideband synchronization symbols are initially appended to a signal. The synchronization symbol(s) may be of any length sufficient to allow a receiving device to determine if the received signal or waveform contains legitimate content or data or determine where the content begins within the signal.

According to one implementation, a synchronization symbol of length N is employed (where N is the number of samples). For example, a randomly generated symbol of length two hundred fifty-six (256) samples may be used. The synchronization symbol may be repeated multiple times to allow for better time alignment.

Figure 1:
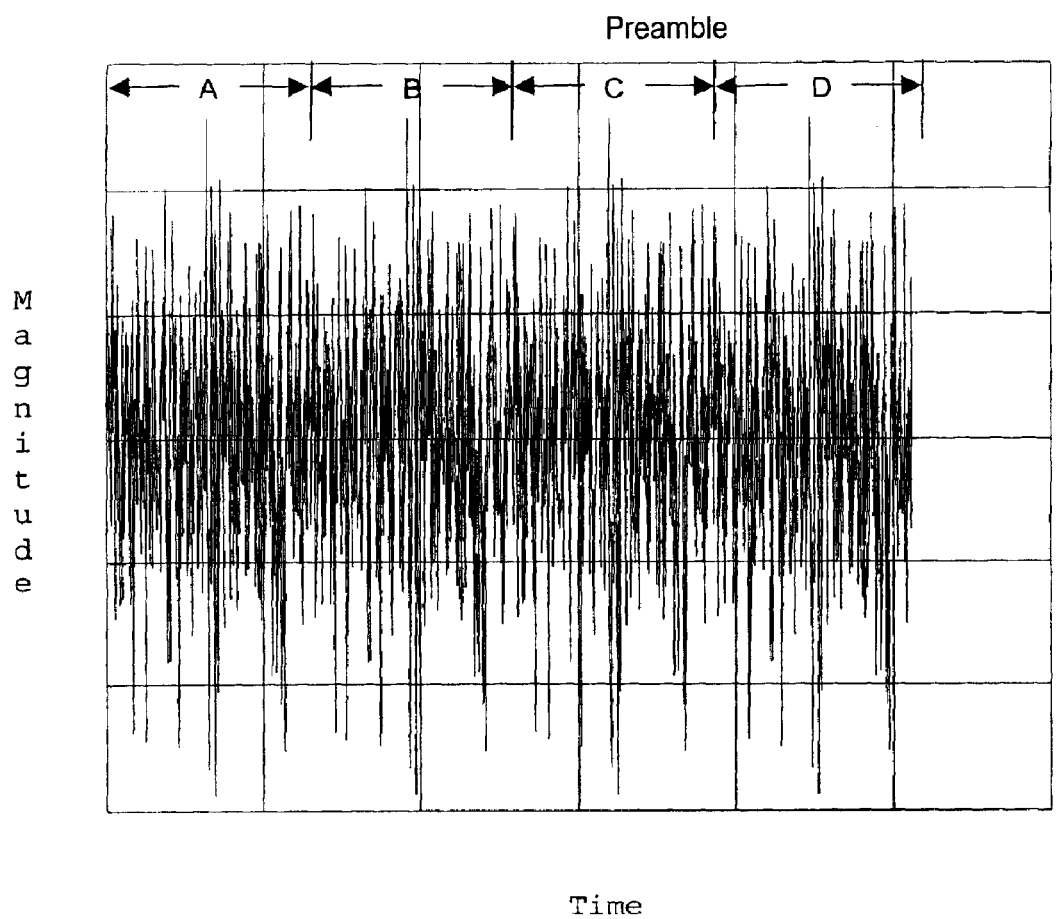
FIG. 1 is an exemplary embodiment of a preamble signal as may be utilized for symbol synchronization in the present invention.

FIG. 1 is an exemplary embodiment of a preamble signal as may be utilized for symbol synchronization in the present invention. As illustrated in FIG. 1 the same wideband synchronization symbol is repeated four times (indicated as A, B, C, and D) to form a preamble signal.

The preamble signal, along with a frame of data, is transmitted across the channel where it is corrupted by additive noise and narrowband interference signals.

Figure 2:
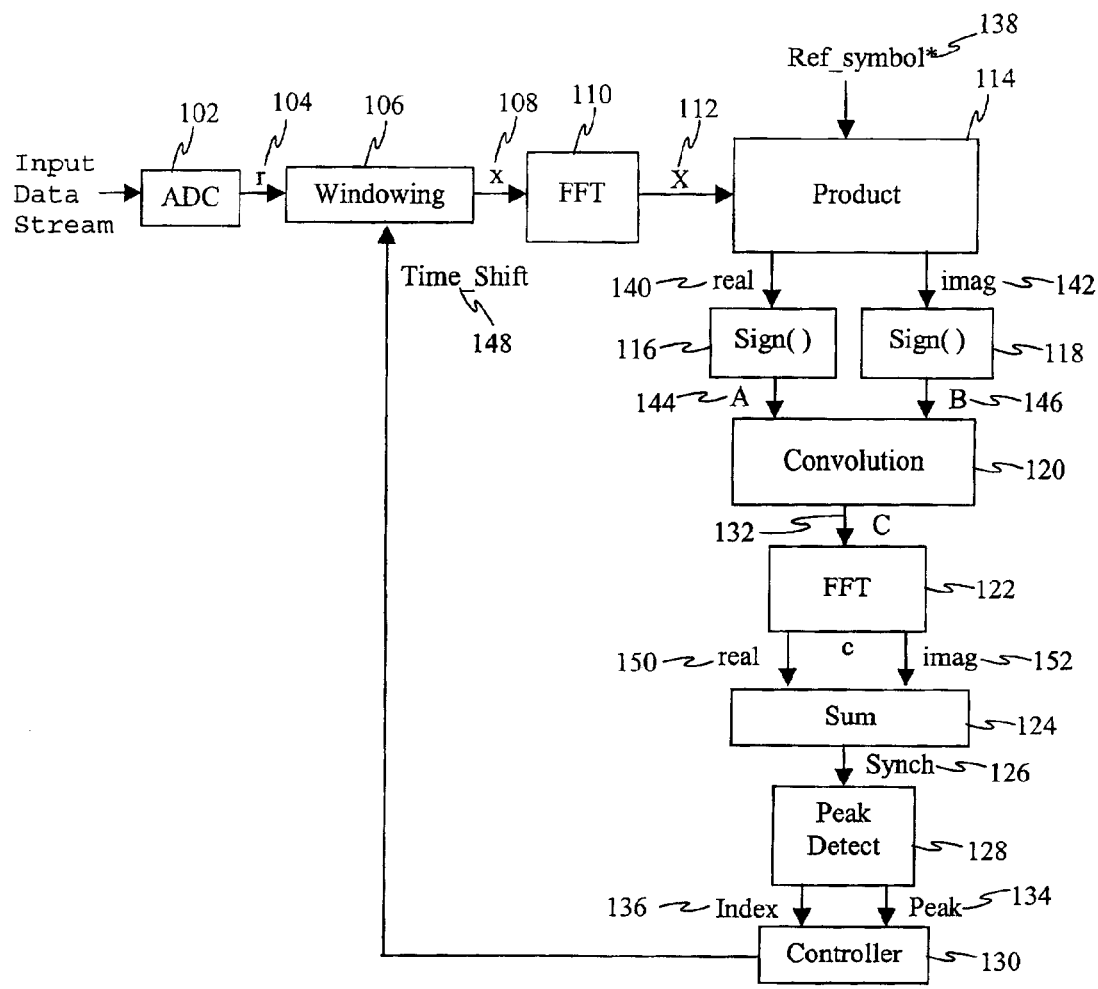
FIG. 2 is an exemplary block diagram illustrating the operation of the present invention.

FIG. 2 is a block diagram illustrating the processing and synchronization of a transmitted signal or waveform at a receiving device or system. FIG. 3 illustrates pseudo code for implementing one embodiment of the invention according to the block diagram of FIG. 2. FIGS. 4-7 provide illustrative signals as they may appear at various points of the block diagram in FIG. 2.

Referring to FIG. 2, a received signal (Input Data Stream) is processed by an analog to digital converter 102 (ADC), the ADC output 104 is framed and windowed (truncated) 106 to a length equal to the length of the synchronization symbols. For example, a two hundred and fifty-six (256) Hanning window may be used in an implementation where a synchronization symbol two hundred and fifty-six (256) samples long is employed.

Windowing 106 is performed to reduce the interference spread in the frequency domain. The windowed data 108 is analyzed using a FFT processor 110 of a proper length to convert the signal from the time domain into the frequency domain.

Figure 4:
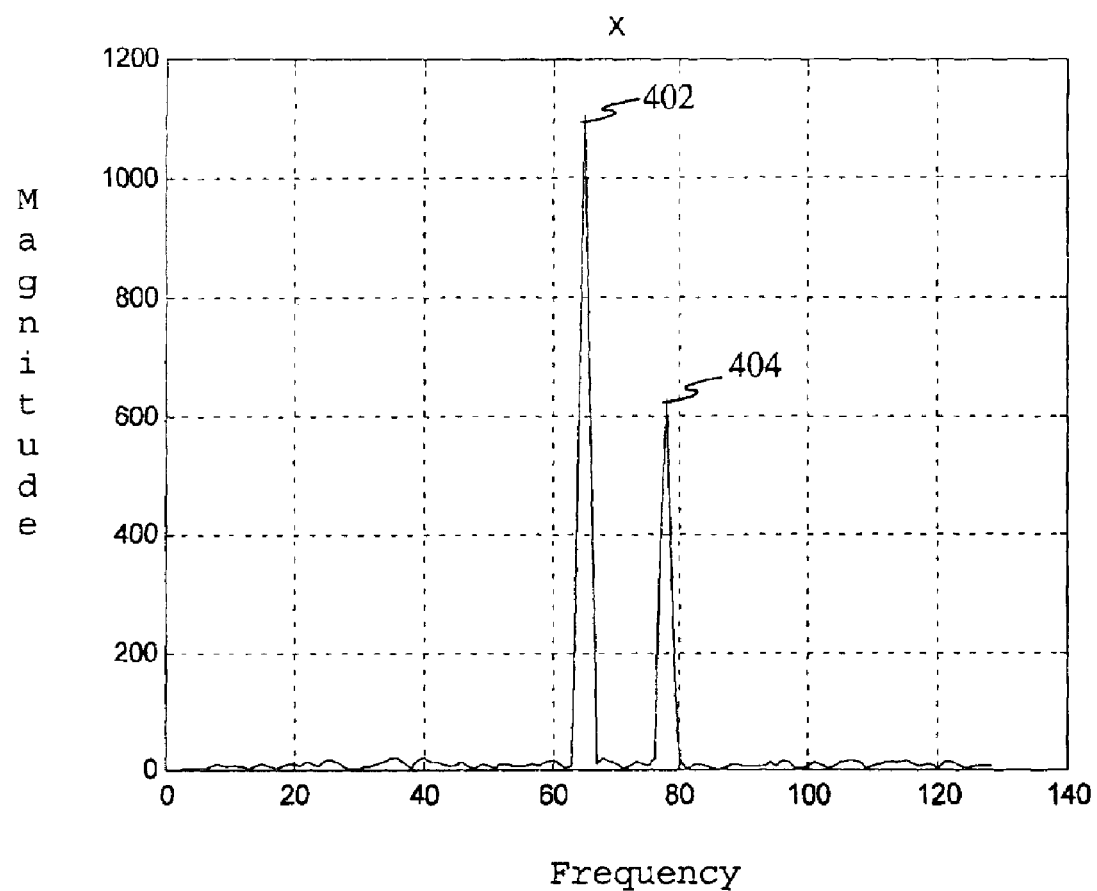
FIG. 4 illustrates an exemplary embodiment of two strong narrowband interferences as seen at the FFT output point X in the block diagram shown in FIG. 2.

An example of the output of the FFT X 110 is illustrated in FIG. 4. The presence of two strong narrowband interference signals 402 and 404 is seen in this graph. This illustrative graph, as well as those of FIGS. 5–7, assume a signal to noise ratio of about ten (10) decibels (dB), and two interference signals 402 and 404 of about twenty-five (25) dB and twenty (20) dB stronger than the signal, respectively.

The output X 112 of the FFT 110 is then correlated (multiplied in the frequency domain) with the reference synchronization symbol 138. The reference synchronization symbol 138 is the frequency domain representation of the transmitted synchronization symbol and is known beforehand by the receiving system.

The result of the correlation (product) 114 is a signal with real 140 and imaginary 142 components containing time-shift information for the input data stream.

The sign of each signal component 116 and 118 is then obtained to provide corresponding signals A 144 and B 146 respectively. Relying on the sign of the outputs 116 and 118 of the frequency domain correlator 114 makes the invented approach less complex and more robust to signal gain or magnitude variations. Determining the sign of the outputs 116 and 118 also removes processing ambiguities associated with signal phases greater than three hundred sixty (360) degrees.

The resulting sign signals A 144 and B 146 are then convolved 120. A convolved signal C 132 of typical shape is shown in FIG. 4. Convolving the signals A 144 and B 146, which carry common signal information, helps to reduce the noise in the resulting signal C 132.

Figure 5:
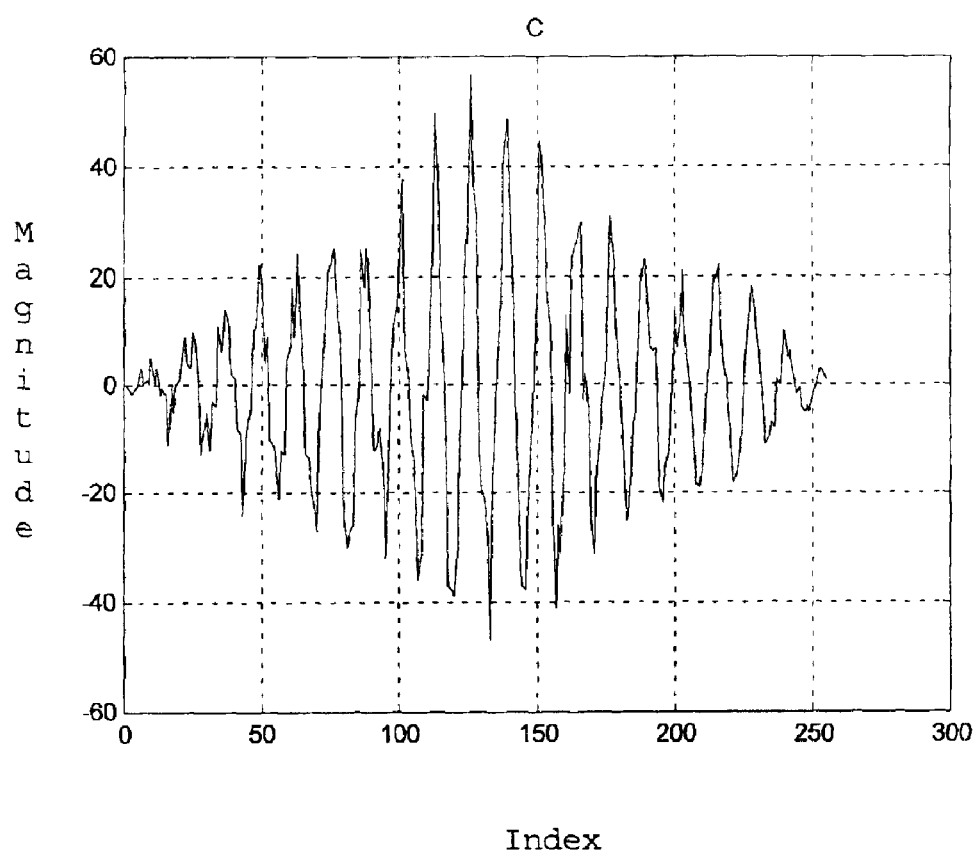
FIG. 5 illustrates a typical shape of an exemplary signal obtained at point C on the block diagram shown in FIG. 2.

The frequency and sign of signal C 132 provide the time-shift information to align the input data signal (Input Data Stream). An exemplary embodiment of a signal (at point C 132 in FIG. 2) is illustrated in FIG. 5. To extract the time-shift information from the signal C 132, another FFT processing 122 is performed. The real 150 and imaginary 152 components of the resulting signal are then added (sum) 124 to provide a synchronization (Synch) signal 126. The Synch signal 126 indicates how much alignment (symbol time-shift) is necessary to synchronize the input data stream.

The Synch signal 126 may then be processed by a peak detection module to provide the time-shift parameters (peak 134 and index 136).

Figure 6:
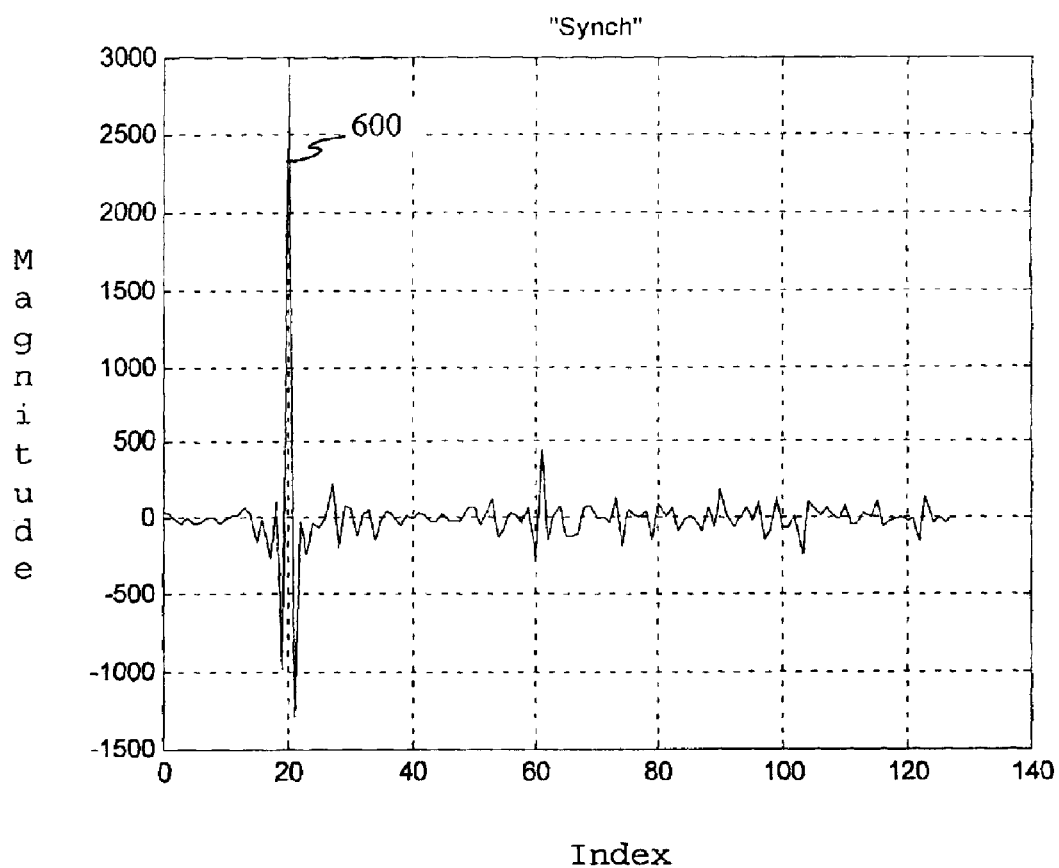
FIG. 6 illustrates an exemplary Synch signal obtained using the synchronizer of FIG. 2.

FIG. 6 illustrates an example Synch 126 signal. The index 136 and the sign of the peak 134 (positive or negative) of this signal is used by a controller 130 to determine the amount and the direction of the required time-shift 148.

For the example illustrated in FIG. 6, a time-shift 148 of twenty (20) samples is required to align the receiver and the transmitter. The number of samples is indicated by the index 136 corresponding to the location of the peak 600. The peak sign indicates the direction of the time-shift.

Figure 7:
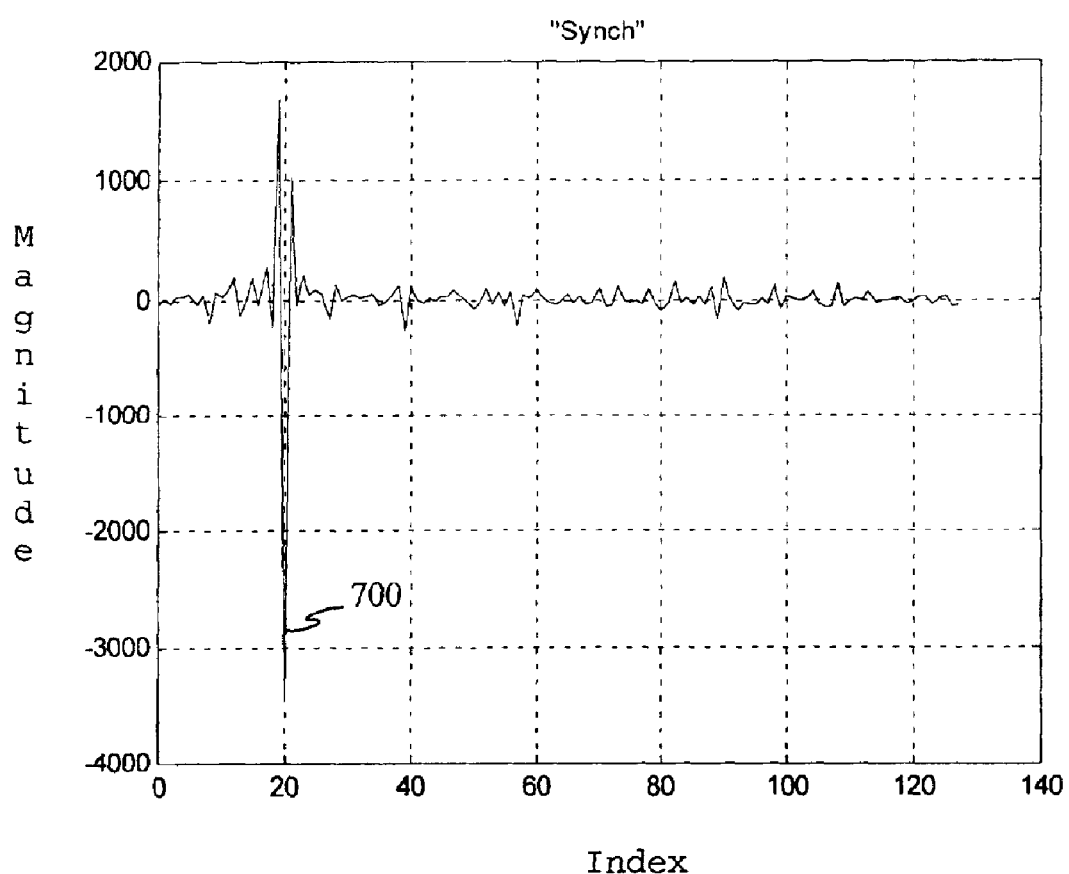
FIG. 7 illustrates another exemplary Synch signal were the time-shift is in the reverse direction as that of FIG. 6.

FIG. 7 shows the case where a time-shift 148 in the reverse direction 700 is required. The same structure of FIG. 2 may be used to initially detect the signal.

According to one aspect of the invention, the presence of a preamble synchronization symbol may be first asserted by comparing the peak signal 134 with a threshold magnitude level, before proceeding with symbol synchronization as described.

The algorithm of the invention works with a wide range of synchronization symbols including many randomly generated ones.

According to another aspect of the invention, the symbol synchronizer of FIG. 2 may be repeatedly invoked with various initial time-shifts (provided that preamble is long enough) to more accurately synchronize the input signal or data stream. In one implementation the resulting time-shift signal 148 may be integrated for more accurate symbol synchronization.

Various windowing functions may be employed including, but not limited to, Hanning, Hamming, Blackman, Blackman-Harris, Kaiser-Bessel, and rectangular windowing without deviating from the invention.

According to an alternative implementation, a single signal, either A 144 or B 146, may be employed in obtaining the synchronization signal. In such embodiment, the convolution 120 is skipped.

As a person of ordinary skill in the art will recognize, a narrowband is merely narrow relative to the overall width of the communication channel employed. Thus, the width of narrowband interference need not be narrow in absolute terms but just in relative terms.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the invention or some of its features in hardware, programmable devices, firmware, integrated circuits, software or a combination thereof where the software is provided in a machine-readable or processor-readable storage medium such as a magnetic, optical, or semiconductor storage medium.

What is claimed is:

1. A method for symbol synchronization comprising:
   performing a windowing function on a received signal to produce a symbol sample;
   multiplying the symbol sample and a reference synchronization symbol in the frequency domain to produce a first signal;
   determining the sign of the first signal to produce a second signal; and
   performing a Fourier transform on the second signal to produce a third signal containing time-shift information to align the received signal.

2. The method of claim 1 wherein the length of the symbol sample is equal to the length of the reference synchronization symbol.

3. The method of claim 1 wherein the windowing function is accomplished by a Hanning windowing function.

4. The method of claim 1 further comprising:
   performing a Fourier transform on the symbol sample to transform the symbol sample from the time domain to the frequency domain before it is multiplied with the reference synchronization symbol.

5. The method of claim 1 wherein the first signal comprises real and imaginary frequency components.

6. The method of claim 5 wherein determining the sign of the first signal comprises determining the signs of both the real and imaginary frequency components of the first signal to produce two corresponding signal components which comprise a fourth signal.

7. The method of claim 6 wherein the two components of the fourth signal are convolved to produce the second signal.

8. The method of claim 1 wherein the Fourier transform performed on the second signal is a fast Fourier transform.

9. The method of claim 1 wherein the third signal comprises real and imaginary components.

10. The method of claim 9 further comprising:
adding the real and imaginary components of the third signal together to produce a fifth signal.

11. The method of claim 10 further comprising:
aligning the received signal according to the time-shift indicated by the fifth signal.

12. The method of claim 10 further comprising:
detecting the peak of the fifth signal to determine the time-shift required to align the received signal.

13. The method of claim 12 further comprising:
generating an index based on the location of the detected peak, the index corresponding to the amount by which to time-shift the received signal to synchronize it.

14. The method of claim 12 wherein the magnitude of the peak indicates the direction of the time-shift required to align the received signal.

15. A machine-readable medium having one or more instructions for synchronizing a received signal, which when executed by a processor, causes the processor to perform operations comprising:
performing a windowing function on the received signal to produce a symbol sample;
multiplying the symbol sample and a reference synchronization symbol in the frequency domain to produce a first signal;
determining the sign of the first signal to produce a second signal; and
performing a Fourier transform on the second signal to produce a third signal containing time-shift information to align the received signal.

16. The machine-readable medium of claim 15 wherein the length of the symbol sample is equal to the length of the reference synchronization symbol.

17. The machine-readable medium of claim 15 wherein the windowing is accomplished by a Hanning windowing function.

18. The machine-readable medium of claim 15 further comprising:
performing a Fourier transform on the symbol sample to transform the symbol sample from the time domain to the frequency domain before it is multiplied with the reference synchronization symbol.

19. The machine-readable medium of claim 15 wherein the first signal comprises real and imaginary frequency components.

20. The machine-readable medium of claim 19 wherein determining the sign of the first signal comprises determining the signs of both the real and imaginary frequency components of the first signal to produce two corresponding components which comprise a fourth signal.

21. The machine-readable medium of claim 20 wherein the two components of the fourth signal are convolved to produce the second signal.

22. The machine-readable medium of claim 15 wherein the Fourier transform performed on the second signal is a fast Fourier transform.

23. The machine-readable medium of claim 15 wherein the third signal comprises real and imaginary components.

24. The machine-readable medium of claim 23 further comprising:
adding the real and imaginary components of the third signal together to produce a fifth signal.

25. The machine-readable medium of claim 24 further comprising:
aligning the received signal according to the time-shift indicated by the fifth signal.

26. The machine-readable medium of claim 25 further comprising:
detecting the peak of the fifth signal to determine the time-shift required to align the received signal.

27. The machine-readable medium of claim 26 further comprising:
generating an index based on the location of the detected peak, the index corresponding to the amount by which to time-shift the received signal to synchronize it.

28. The machine-readable medium of claim 26 wherein the magnitude of the peak indicates the direction of the time-shift required to align the received signal.

29. A device for aligning a received signal comprising:
a windowing module to perform a windowing function on the received signal to produce a symbol sample therefrom;
a multiply module communicatively coupled to the windowing module to receive the symbol sample and multiply the symbol sample to a reference synchronization symbol in the frequency domain to produce a first signal therefrom;
a sign detector module communicatively coupled to the multiply module to receive the first signal, determine the sign of the first signal, and produce a second signal therefrom; and
a Fourier transform module communicatively coupled to the sign detector module to receive the second signal, perform a Fourier transform on the second signal, and produce a third signal therefrom containing time-shift information to align the received signal.

30. The device of claim 29 wherein the length of the symbol sample is equal to the length of the reference synchronization symbol.

31. The device of claim 30 wherein the windowing module is capable of performing a Hanning windowing function.

32. The device of claim 29 wherein the first signal produced by the multiply module has real and imaginary components.

33. The device of claim 32 wherein the sign detector module determines the sign of the real and imaginary components of the first signal, and produces two corresponding signal components which comprise a fourth signal.

34. The device of claim 33 further comprising:
a convolution module communicatively coupled to the sign detector module to receive the fourth signal components and convolved them to produce the second signal.

35. The device of claim 29 wherein the Fourier transform module is capable of performing fast Fourier transforms.

36. The device of claim 29 further comprising:
a second Fourier transform module communicatively coupled to receive the second signal from the sign extractor module, perform a Fourier transform on the symbol sample to transform the symbol sample from the time domain to the frequency domain before it is multiplied to the reference synchronization symbol.

37. The device of claim 36 wherein the third signal produced by the second Fourier transform module comprises real and imaginary components.

38. The device of claim 37 further comprising:

an adding component communicatively coupled to the second Fourier transform module to receive the third signal, add the real and imaginary components of the third signal and produce a fifth signal.

39. The device of claim 38 further comprising:

a peak detector to detect the peak of the fifth signal and determine the time-shift required to align the received signal.

40. The device of claim 39 further comprising:

a controller communicatively coupled to the peak detector to received the received signal according to the time-shift indicated by the fifth signal.

41. A system for aligning a received signal comprising:

means for windowing the received signal to produce a symbol sample;

means for multiplying the symbol sample and a reference synchronization symbol in the frequency domain to produce a first signal;

means for determining the sign of the first signal to produce a second signal; and means for performing a Fourier transform on the second signal to produce a third signal containing time-shift information to align the received signal.

42. The system of claim 41 wherein the length of the symbol sample is equal to the length of the reference synchronization symbol.

43. The system of claim 42 wherein the windowing is accomplished by a Hanning windowing function.

44. The system of claim 41 further comprising:

means for performing a Fourier transform on the symbol sample to transform the symbol sample from the time domain to the frequency domain before it is multiplied with the reference synchronization symbol.

45. The system of claim 41 further comprising:

means for detecting the peak of the third signal to determine the time-shift required to align the received signal.

46. The system of claim 41 further comprising:

means for aligning the received signal according to the time-shift indicated by the third signal.

* * * * *